United States Patent
Burkley et al.

(10) Patent No.: US 7,373,475 B2
(45) Date of Patent: May 13, 2008

(54) METHODS FOR OPTIMIZING MEMORY UNIT USAGE TO MAXIMIZE PACKET THROUGHPUT FOR MULTI-PROCESSOR MULTI-THREADED ARCHITECTURES

(75) Inventors: Paul Burkley, Limerick (IE); Prashant Chandra, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 11/157,711

(22) Filed: Jun. 21, 2005

(65) Prior Publication Data

US 2007/0005925 A1     Jan. 4, 2007

(51) Int. Cl.
G06F 12/00    (2006.01)

(52) U.S. Cl. .................. 711/170; 711/104; 711/105; 711/156; 711/158; 703/22; 709/226

(58) Field of Classification Search .......... 709/226; 711/170, 104, 105, 156, 158; 703/22
See application file for complete search history.

(56) References Cited

U.S. PATENT DOCUMENTS

| | | | |
|---|---|---|---|
| 5,906,442 A * | 5/1999 | Kishida | 400/61 |
| 6,680,908 B1 * | 1/2004 | Gibson et al. | 370/229 |
| 6,742,020 B1 * | 5/2004 | Dimitroff et al. | 709/217 |
| 2003/0041163 A1 * | 2/2003 | Rhoades et al. | 709/232 |
| 2003/0236961 A1 * | 12/2003 | Qiu et al. | 711/170 |
| 2004/0059711 A1 * | 3/2004 | Jandel et al. | 707/1 |
| 2005/0066144 A1 * | 3/2005 | Alferness et al. | 711/170 |

* cited by examiner

*Primary Examiner*—Stephen Elmore
(74) *Attorney, Agent, or Firm*—Blakely, Sokoloff, Taylor & Zafman LLP

(57) ABSTRACT

Methods for optimizing memory unit usage to maximize packet throughput for a multiprocessor multithreaded architecture. One method employs a first phase of a software algorithm to allocate data structures to memory units in which the data units are stored and accessed during processing operations. The allocation is such that the data structures are allocated to memory units having lower latencies while satisfying capacity and bandwidth constraints for the memory units. A second phase of the algorithm may be employed to tune the allocation, wherein the performance level of an initial allocation and subsequent reallocations are simulated for an environment in which the memory units and data structures are to be implemented. From the simulation, the allocation providing the best performance level is selected. The simulated environment may include network processor unit (NPU) environments, with the performance level comprising a measure of packet throughput.

18 Claims, 9 Drawing Sheets

```
allocateDataStructures()
{
    // initialize list of memory units, and sort by latency, lowest first // initialize list of data structures, and sort by resource usage, highest first allocateDataStructures(0);
} allocateDataStructures(int dataStructureIndex)
{
    // get the current data structure
    DataStructure dataStructure = dataStructureList.lookupByIndex(dataStructureIndex);

// iterate over the memory units
    for (int memoryUnitIndex = 0; memoryUnitIndex < numMemoryUnits; memoryUnitIndex++)
    {
        // get the current memory unit
        MemoryUnit memoryUnit = memoryUnitList.lookupByIndex(memoryUnitIndex);

// allocate the data structure to the memory unit
        memoryUnit.allocate(dataStructure);

// ensure capacity and bandwidth constraints are met
        if (memoryUnit.capacityOk() && memoryUnit.bandwidthOk())
        {
            // allocate any remaining data structures
            if (dataStructureIndex + 1 < numDataStructures)
            {
                // call this method recursively
                allocateDataStructures(dataStructureIndex + 1);
            }
            else
            {
                // all data structures are successfully allocated - end the search
            }
        }

// unallocate the data structure from the memory unit
        memoryUnit.unallocate(dataStructure);
    }
}
```

*Fig. 1*

| Memory Unit | Size (KB) | Bandwidth (MB/s) | Latency |
|---|---|---|---|
| MU0 | 32 | 2.0 | Low |
| MU1 | 64 | 4.0 | Medium |
| MU2 | 512 | 8.0 | High |

| Data Structure | Size (KB) | Bandwidth (MB/s) |
|---|---|---|
| DS0 | 256 | 4.0 |
| DS1 | 24 | 2.0 |
| DS2 | 16 | 1.0 |
| DS3 | 8 | 1.0 |

| Iteration # | DS0 | DS1 | DS2 | DS3 | Constraints met? | All allocated? |
|---|---|---|---|---|---|---|
| 1 | MU0 *† | - | - | - | No | No |
| 2 | MU1 * | - | - | - | No | No |
| 3 | MU2 | - | - | - | Yes | No |
| 4 | MU2 | MU0 | - | - | Yes | No |
| 5 | MU2 | MU0 | MU0 * | - | No | No |
| 6 | MU2 | MU0 | MU1 | - | Yes | No |
| 7 | MU2 | MU0 | MU1 | MU0 * | No | No |
| 8 | MU2 | MU0 | MU1 | MU1 | Yes | Yes |

\* Capacity not met
† Bandwidth not met

*Fig. 3c*　320

```
maximizePacketThroughput()
{
  // initialize list of data structures maximizePacketThroughput(0);
} maximizePacketThroughput(int dataStructureIndex)
{
  // get the current data structure
  DataStructure dataStructure = dataStructureList.lookupByIndex(dataStructureIndex);

// get the relative latency rank of the memory unit to which the data structure is currently allocated
  MemoryUnit memoryUnit = dataStructure.getCurrentAllocation();
  LatencyRank memoryUnitLatencyRank = memoryUnit.getLatencyRank();

// iterate over the latency ranks in descending order
  // note: the lower the latency rank, the lower the associated latency
  for (int latencyRank = memoryUnitLatencyRank; latencyRank >= MINIMUM_LATENCY_RANK; latencyRank--)
  {
    // no latency restriction is imposed for the first iteration
    if (latencyRank < memoryUnitLatencyRank)
    {
      // impose latency restriction for this data structure
      dataStructure.setMaximumPermissableLatencyRank(latencyRank);

// allocate data structures to satisfy capacity and bandwidth constraints (adhering to restrictions)
      // note: this is the algorithm described earlier
      allocateDataStructures();
```

*Fig. 4a*

```
            // if no allocation was found (with latency restrictions imposed)
            if (!allocationWasFound)
            {
                // no more allocations will be found by further restricting this data structure so abort
                break;
            }
        } // end: if (latencyRank ...

// process any remaining data structures
        if (dataStructureIndex + 1 < numDataStructures)
        {
            // call this method recursively
            maximizePacketThroughput(dataStructureIndex + 1);
        }
        else
        {
            // all data structures have been processed - get packet throughput for current allocation
            // note: if this allocation's throughput has been previously calculated then skip this step
            simulationEngine.runFor(currentAllocation);
            int packetThroughput = simulationEngine.getPacketThroughput();

if (packetThroughput > maxPacketThroughput)
            {
                maxPacketThroughput = packetThroughput;
                bestAllocation = currentAllocation;
            }
        } // end: if (dataStructureIndex ... else
    } // end: for (int latencyRank ...

// remove maximum latency restriction for this data structure
    dataStructure.setMaximumPermissableLatencyRank(MAXIMUM_LATENCY_RANK);
}
```

*Fig. 4b*

| Data Structure | Current Allocation | Memory Unit Latency |
|---|---|---|
| DS0 | MU2 | High |
| DS1 | MU0 | Low |
| DS2 | MU1 | Medium |
| DS3 | MU1 | Medium |

| Iteration # | DS0 max | DS1 max | DS2 max | DS3 max | DS0 | DS1 | DS2 | DS3 | Packet Throughput |
|---|---|---|---|---|---|---|---|---|---|
| 1 | High | Low | Medium | Medium | MU2 | MU0 | MU1 | MU1 | 1,000,000 |
| 2 | High | Low | Medium | Low* | MU2 | MU1 | MU0 | MU0 | 1,100,000 |
| 3 | High | Low | Low* | Medium | MU2 | MU1 | MU0 | MU0 | 1,050,000 |
| 4 | High | Low | Low* | Low* | MU2 | MU1 | MU0 | MU0 | 1,125,000 |
| 5 | Medium* | Low | Medium | Medium | - | - | - | - | - |

\* Change in Latency

METHODS FOR OPTIMIZING MEMORY UNIT USAGE TO MAXIMIZE PACKET THROUGHPUT FOR MULTI-PROCESSOR MULTI-THREADED ARCHITECTURES

FIELD OF THE INVENTION

The field of invention relates generally to computer and telecommunications networks and, more specifically but not exclusively relates to methods for optimizing memory unit usage to maximize packet throughput for a multiprocessor multithreaded architecture.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Modern network processors (also commonly referred to as network processor units (NPUs)) perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to switch fabrics, cryptographic processors, hash units, general-purpose processors, and expansion buses, such as the PCI (peripheral component interconnect) and PCI Express bus.

Network processors are often configured to perform processing in a collaborative manner, such as via a pipelined processing scheme. Typically, different threads perform different portions of the same task or related tasks, with the output of one thread being employed as an input to the next thread. The threads are specifically tailored for a particular task or set of tasks, such as packet forwarding, packet classification, etc. This type of scheme enables packet-processing operations to be carried out at line rates for most packets, also referred to as "fast path" operations.

In general, the foregoing packet processing operations require multiple memory accesses to one or more memory units. As a result, packet throughput is inherently related to memory (access) latencies. Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory on an NPU (e.g., scratch memory) is typically very small.

The next fastest type of memory is off-chip SRAM. Since this memory is off-chip, it requires a special interface (e.g., bus) to access it, adding a level of latency to the memory access. However, it still has relatively-low latency.

Typically, various types of off-chip dynamic RAM (DRAM) are employed for use as "bulk" memory units. Dynamic RAM is slower than static RAM (due to physical differences in the design and operation of DRAM and SRAM cells), and must be refreshed every few clock cycles, taking up additional overhead. As before, since it is off-chip, it also requires a special bus to access it. In most of today's network processor designs, DRAM memory stores with enhanced performance are employed, including RDRAM (Rambus DRAM) or DDR DRAM (double data rate), RLDRAM (reduced latency RAM) etc. via dedicated signals. As used herein, a memory unit comprises one or more memory storage devices having associated memory spaces.

An application designer faces the challenging task of utilizing the memory units available to an NPU in such a fashion as to ensure that a minimum amount of latency is incurred during packet processing operations, in order to maximize the packet throughput. Currently, memory unit utilization is done on a trial and error or educated guess basis in consideration of projected traffic patterns and service levels to be provided by the network element in which one or more NPU's are installed. This produces inefficient memory utilization, reducing packet throughput.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 shows a pseudocode listing corresponding to one embodiment of an algorithm that is used to allocated data structures to memory units;

FIG. 3a shows a table containing an exemplary list of memory units employed for illustrating operations of the data structure to memory unit allocation algorithms described herein;

FIG. 3b shows a table containing an exemplary list of data structures employed for illustrating operations of the data structure to memory unit allocation algorithms described herein;

FIG. 3c is a table illustrating the results for various iterations of the algorithm of FIGS. 1 and 2 when allocated the data structures of FIG. 3b to the memory units of FIG. 3a;

FIGS. 4a and 4b collectively show a pseudocode listing corresponding to one embodiment of an algorithm that is used to optimize the allocation of data structures to memory units;

FIG. 6a shows a table containing data pertaining to an initial allocation of the data structures of FIG. 3b to the memory units of FIG. 3a;

FIG. 6*b* shows an table illustrating the packet throughput results of various iterations of the algorithm of FIGS. 4*a*-*b* and 5 for different allocations of the data structures of FIG. 3*b* to the memory units of FIG. 3*a*;

DETAILED DESCRIPTION

Figure 2:
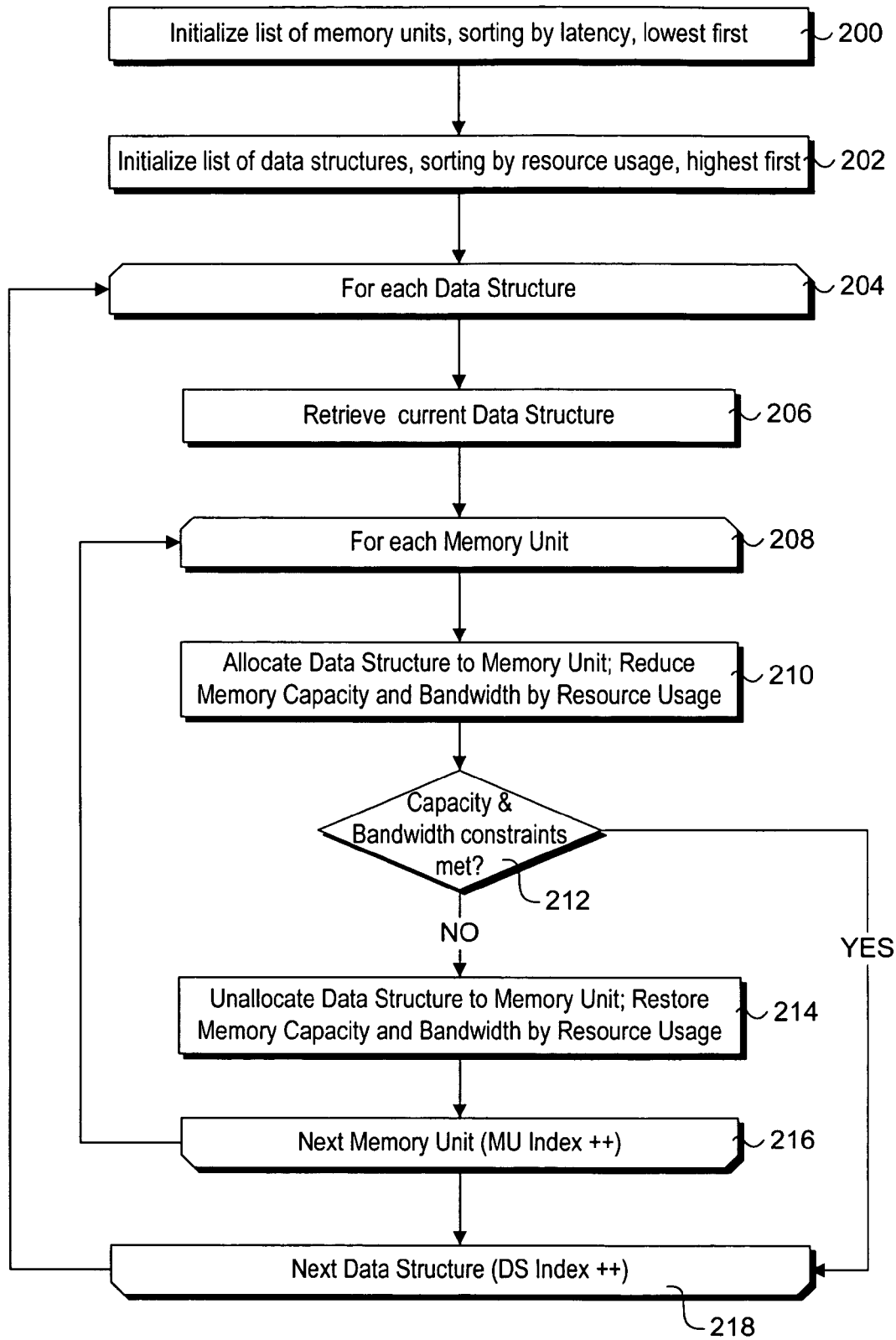
FIG. 2 shows a flowchart illustrating operations and logic implemented via the allocation algorithm of FIG. 1

Embodiments of methods and software for optimizing memory unit usage to maximize packet throughput for multi-processor multi-threaded architectures are described herein. In the following description, numerous specific details are set forth, such as implementations using Intel's® NPUs, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, techniques are provided for optimizing memory unit usage to maximize performance levels. While the following examples pertain to NPU architecture implementations in particular, the general principles and teachings of the techniques may be employed in other architectures and systems as well.

This specification describes an algorithm to find an optimal use of a network processor's memory units, given the availability of a dynamic simulator capable of simulating a given application on the network processor (and/or environment in which the NPU is deployed). For purposes of the algorithm, the use of memory units is put in terms of data structures and data structure accesses. Data structures have a defined size, while memory units have a defined (storage) capacity. During packet processing, data structures may be accessed, either written to or read from. The actual commands used to access the data structures will incur predetermined latency penalties as dictated by the specifications of the relevant memory unit types (e.g., scratch memory, off-chip SRAM, off-chip DRAM, etc.) The size of the data structure accesses will tax the buses connecting the issuing processing engines to the relevant memory units. These buses have a defined bandwidth that limits the maximum achievable data transfer rate.

The algorithm described herein iteratively allocates data structures to memory units in search of an allocation that maximizes packet throughput. Two constraints exist when allocating data structures to memory units:

1. Memory capacity utilizations must not exceed the available capacity; and
2. Memory bus bandwidth utilizations must not exceed the available bandwidth.

The memory capacity constraint exists because only so many data structures may be allocated to a memory unit before it becomes full. The memory bus bandwidth constraint exists because if and when a bus becomes overloaded, the latency of accesses to the memory unit grow exponentially and packet throughput is ultimately degraded. It is noted that headroom may be factored into the algorithm if desired, by down-grading the available capacity and/or bandwidth before commencing the search for an optimal solution.

Once data structures have been allocated in such a way as to satisfy the capacity and bandwidth constraints, the packet throughput is measured and assessed in view of the dynamic simulation. Different allocations may be tried in order to find the one that maximizes packet throughput. In one embodiment, this entire process is automated via execution of a software tool on a computer system.

Satisfying Capacity and Bandwidth Constraints

The algorithm works by iteratively allocating data structures to memory units and assessing the constraints after each individual allocation. As soon as the constraints are no longer satisfied, the current allocation is undone and the next possibility tried. This indicates that there isn't sufficient bandwidth and/or capacity for the current allocation. After one data structure is successfully allocated to a memory unit, the next data structure is allocated, and so on until all data structures are eventually allocated. In general, more than one successful allocation may exist; however, in one embodiment, the first successful allocation that is found is returned by the algorithm. As described below, this initial allocation may be modified, if necessary, to identify an optimum allocation.

Allocation here simply means subtracting the data structure's resource usage from the memory unit's resource availability. For capacity this will be in bytes, while for bus bandwidth this will be in bytes/second. Prior to commencing the search, a data structure's size and bandwidth usage are defined or determined. Similarly, a memory unit's size and bandwidth availability are also defined or determined. The bandwidth data can be derived from a dynamic simulation engine that simulates the data structure accesses on the network processor and assesses the loading on the buses.

In one embodiment, the data structures are ordered in terms of highest resource usage to lowest resource usage. Resource usage here refers to both capacity and bandwidth usage. The biggest (capacity) and most accessed (bandwidth) data structures are considered first, while the smallest (capacity) and least accessed (bandwidth) are considered last. In this way, the algorithm attempts to pack the biggest pieces into the available space first, before proceeding to the smaller pieces. This optimizes the search for the optimal allocation by pruning futile paths from the search tree.

The memory units being allocated to are ordered in terms of lowest latency to highest latency. Latency here is relative and is not measured as an absolute, just a relative ranking to compare memory units to each other. For example, scratch memory will be considered to have lower latency than off-chip SRAM, which in turn will be considered to have lower latency than off-chip DRAM. In this way the algorithm will try to allocate data structures first to lower latency memory units, and only if they don't fit then to higher latency memory units. This helps to find a solution likely to yield a high packet throughput, by minimizing the latency associated with accesses to the data structures.

One embodiment of the allocation algorithm body is described in pseudo-code as shown in FIG. 1, while a corresponding flowchart illustrating the operations and logic implemented by the algorithm body are shown in FIG. 2. The operations begin in a block 200, wherein a list of memory units is initialized. A memory unit table 300 containing an exemplary list of memory units is shown in FIG. 3a. Each entry in this table includes a memory unit identifier (ID) 302, a size 304, a bandwidth 306, and a relative latency 310. The entries in the memory unit table are sorted by relative latency, from the lowest to highest latency, as illustrated in memory unit table 300. In one embodiment, the memory unit ID 302 is used as a table index.

Another initialization operation is performed in a block 202, wherein a list of data structures is initialized. A data structure table 310 containing an exemplary list of data structures including four entries is shown in FIG. 3a. Each data structure entry includes a data structure ID 312, a size 314, and a bandwidth usage 316. The entries in the list are sorted by resource usage, from the highest resource usage value to the lowest. In one embodiment, the data structure ID 312 is used as a table index.

After the initialization operations of blocks 200 and 202 have been performed, iteration through the main loops of the algorithm are commenced. This includes iteration through the data structures as depicted by an outer loop defined by start and end loop blocks 204 and 218, and iteration through the memory units as depicted by an inner loop defined by start and end loop blocks 208 and 216.

The outer loop begins with the current data structure index set to 0. Accordingly, the current data structure entry DS0 (e.g., having an index of 0) is retrieved from data structure table 310 in a block 208. Next, iteration of the inner loop is performed, beginning with the first memory unit (e.g., memory unit MU0) of memory unit table 300. In a block 210, the current data structure is allocated to the current memory unit. Then, in a decision block 212, a determination is made to whether both the capacity and bandwidth constraints are met. In view of this first iteration, a data structure DS0 having a size of 256 KB and a bandwidth of 4.0 MB/s is allocated to a memory unit MU0 having a size of 32 KB and a bandwidth of 2.0 MB/s. Thus, neither of the constraints are met, since the size of data structure DS0 is larger than the size of memory unit MU0, while the bandwidth usage of data structure DS0 is greater than the bandwidth availability for memory unit MU0. This result is depicted in the first row of an iteration result table 320 shown in FIG. 3c. In this case, the answer to decision block 212 is NO, and the logic proceeds to a block 214, wherein data structure DS0 is unallocated to memory unit MU0. The logic then proceeds to end loop block 216, which increments the memory unit index by 1 and returns the logic to start loop block 208.

During the second iteration of the inner loop, data structure DS0 is allocated to memory unit MU1 in block 210. As before, the answer to decision block 212 is NO, since the size of memory unit MU1 is too small, causing unallocation of data structure DS0 to memory unit MU1 in block 214. The memory unit index is again incremented by 1 in end loop block 216, returning the logic to start loop block 208 for the next iteration.

During this third iteration of the inner loop, data structure DS0 is allocated to memory unit MU2 in block 210. This time, both the capacity and bandwidth constraints are met, and the answer to decision block 212 is YES. The causes the logic to jump to end loop block 218, wherein the data structure index is incremented by 1. The logic then loops back to start loop block 204, with the entry data for the second data structure DS1 in data structure table 310 being retrieved in block 206. This data structure is then allocated and unallocated (as necessary) in the iterative fashion described above for allocating the first data structure DS0 to a memory unit until both the capacity and bandwidth constraints are met. This allocation process is then repeated until all data structures have been allocated to corresponding memory units will satisfying the capacity and bandwidth constraints.

When a data structure is allocated to a memory unit, the resource usage required for the data structure must be accounted for. Accordingly, the available (i.e., remaining) capacity of the memory unit is reduced by the size of the data structure, while the available (remaining) bandwidth is reduced by the size of the bandwidth usage for the data structure. Meanwhile, when a data structure is unallocated to a memory unit, the available capacity of the memory unit is increased by the size of the data structure, and the available bandwidth is increased by the bandwidth usage for the data structure, restoring the available capacity and bandwidth for the memory unit to their respective values prior to allocation of the data structure.

As a result, during the fourth iteration, data structure DS1, which has a size of 24 KB is allocated to memory unit MU0, which reduces the available capacity of memory unit MU0 from 32 KB to 8 KB, and the available bandwidth from 2.0 MB/s to 0 MB/s. During the fifth iteration, an attempt to allocate data structure DS2 to memory unit MU0 is made. However, this attempt fails, since the (now) available size and bandwidth of memory unit MU0 are insufficient to met the corresponding size and bandwidth usage of data structure DS2. Thus, during the following sixth iteration, data structure DS2 is allocated to memory unit MU1, with the available capacity of memory unit MU1 being reduced by 16 KB to 48 KB, and its available bandwidth being reduced from 4.0 to 1.0 MB/s.

The iterative allocation sequence is continued until the memory and bandwidth constraints are met for the allocation of the final data structure DS3 in the data structure list of data structure table 310. Under the illustrated example, this allocation is made during an eighth iteration with data structure DS3 being allocated to memory unit MU1. At this point, all of the constraints are met and all of the data structures are allocated to a memory unit, completing the allocation of data structures portion of the algorithm.

In case a solution with all the data structures allocated can't be found, the maximum number of data structures allocated can optionally be recorded. The solution with the maximum number of data structures allocated is deemed the best solution.

In one embodiment, in addition to allocating data structures to lower latency ranking memory units before higher latency ranking memory units, the algorithm will attempt to allocate data structures to memory units of the same latency in a round-robin fashion. This will help to achieve more balanced allocations in the case that the constraints are easily met. For example, instead of filling SRAM channel 0 to capacity before starting to fill SRAM channel 1, data structures should be allocated to each channel in turn when searching for a solution. Note this won't inhibit finding a solution if only one, or a handful, of solutions exists. The same solution search takes place, but in a slightly modified order.

It may be desirable to exclude certain data structures from the allocation algorithm, i.e. to lock them down in their current location to prevent them from being moved. The search algorithm can treat such locked down data structures specially, by automatically allocating them to their respective memory units at the beginning of the search, to account for their resource usage. This will help optimize the search process.

The allocation algorithm also needs to consider the validity of moving a data structure to a given memory unit. Each data structure may be accessed by different commands. When considering moving a data structure to a memory unit, the commands used to access the data structure need to be supported by the new memory unit. If they aren't supported, the move is invalid and will not be considered. This further restricts the set of possible solutions, and helps to further optimize the allocation process.

Maximizing Packet Throughput

Once memory bandwidth and capacity constraints are satisfied, the next stage in the algorithm is to maximize the packet throughput. Because of the complex nature of multiprocessor, multi-threaded architectures, it's not practical to statically calculate the packet throughput for a given allocation of data structures to memory units. Instead, a dynamic simulator is employed to accurately simulate the processing of packets for a given allocation. This simulation is used to determine the packet throughput for the allocation, and should simulate a sufficient number of processor cycles such that an average packet throughput rate can be accurately extrapolated.

At this point (after the foregoing allocation process has been implemented), an allocation has been found that satisfies bandwidth and capacity constraints, and that allocation will tend to have the more frequently accessed data structures in the lower latency memory units due to the ordering discussed previously. This makes the allocation a very good starting point from which to improve upon. Note if no allocation has been found up until this point then there is no point in continuing further and the algorithm aborts.

The way this second phase of the overall algorithm improves packet throughput is by reallocating data structures to lower latency memory units than those in which they currently reside (as identified by the first phase of the algorithm). To maximize packet throughput by allocating data structures to memory units, each data structure is considered in turn. The current data structure is restricted to progressively lower latency memory units and with each restriction imposed, a solution is searched for that satisfies the capacity and bandwidth constraints, while respecting the latency restriction. This requires the addition of some logic to the part of the algorithm described previously, whereby before allocating a data structure to a memory unit, any latency restriction imposed on the data structure must be met by the memory unit, otherwise the allocation is skipped and the search continues.

The algorithm first searches for solutions with the current data structure free from any latency restrictions, and then with the data structure progressively restricted to lower latency channels. If an allocation is found with a data structure restricted, then further allocations are searched for with the remaining data structures restricted. This search will find all allocations that meet the original capacity and bandwidth constraints, and that also have some latency restrictions imposed on the data structures. Note one of the allocations tried will be that with no data structures restricted, and this will yield the original allocation found.

Further allocations that are found will have one or more data structures restricted to lower latency memory units than those in which they originally resided, and this may result in an improvement in packet throughput. The packet throughput of each allocation found is calculated by the simulation engine, and the allocation that yields the best packet throughput is recorded.

Figure 5:
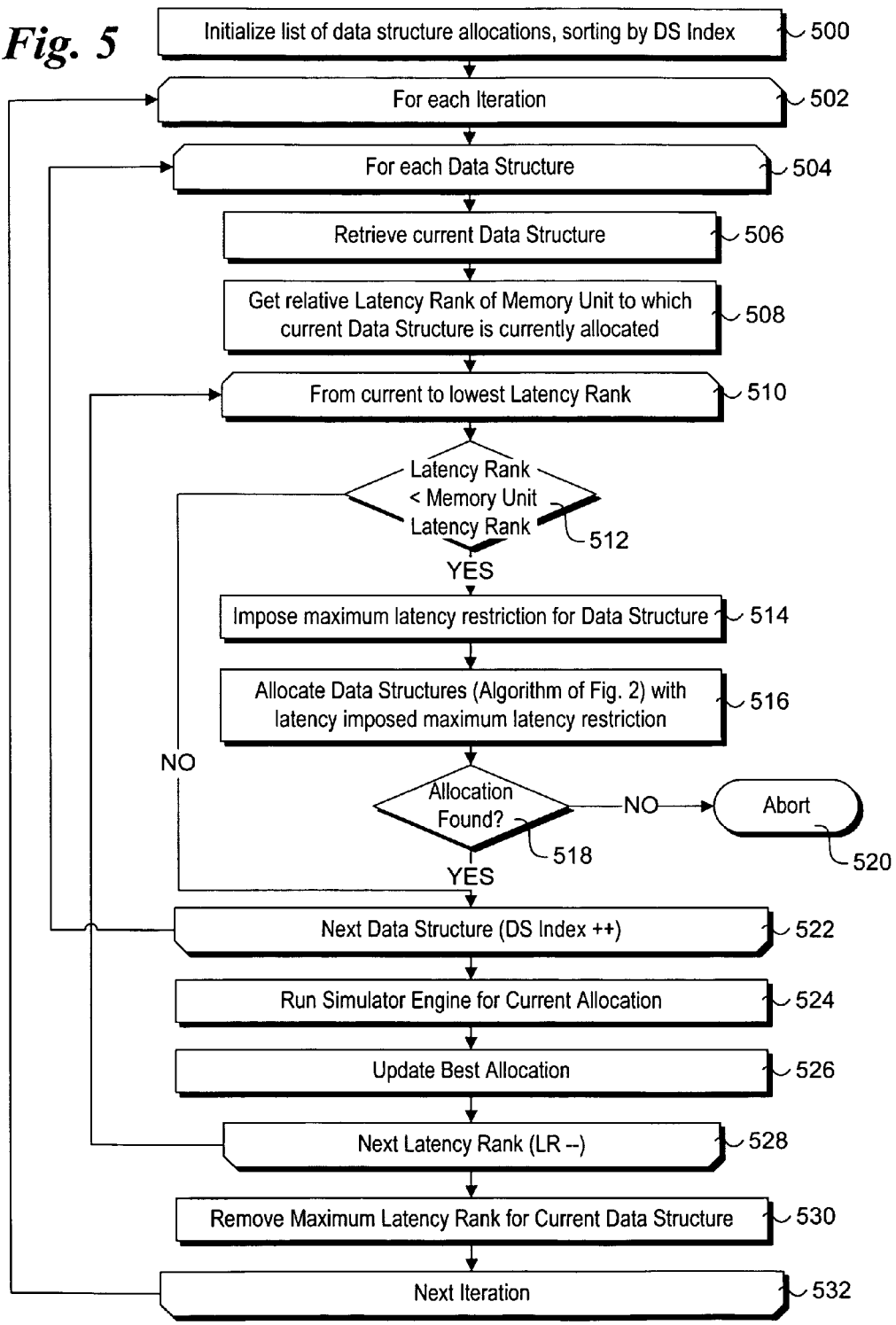
FIG. 5 shows a flowchart illustrating operations and logic implemented via the optimized allocation algorithm of FIGS. 4a-b.

Pseudo-code for one embodiment of the algorithm body for this second optimization phase is shown in FIGS. 4a and 4b, while a corresponding flowchart is shown in FIG. 5. The process begins in a block 500, wherein an original data structure allocation comprising a corresponding list of data structure to memory unit allocations is initialized. A data structure allocation table 600 is shown in FIG. 6a, containing a list of data structure allocations derived during the first phase of the algorithm. Each entry in the data structure allocation table 600 includes a data structure ID, a memory unit ID 604, and a relative memory unit latency value 606.

After the initialization operation of block 500, operations contained within an outer loop defined by start and end loop blocks 502 and 532 are iteratively performed. Another loop that iterates over the data structures is depicted by a start loop block 504 and end loop block 522, beginning with the first data structure DS0. In a block 506, data corresponding to the current data structure is retrieved (e.g., for DS0). The relative latency rank of the memory unit to which the current data structure is currently allocated is then retrieved in a block 508. As shown in data structure table 600 and the first iteration row in an iteration result table 610 of FIG. 6b, the relative latency rank for data structure DS0 is High.

Next, the first operation of another loop that partially overlaps the data structure loop is performed, as shown by a start loop block 510. This loop begins with the current relative latency value for the current data structure and is decremented by 1 with each loop as depicted by an end loop block 528. In a decision block 512, the current value of the latency rank loop is compared with the latency rank for the current data structure. If the loop of the latency rank is >= than the memory unit latency rank (i.e., the latency rank of the memory unit to which the current data structure is allocated), the logic proceeds to end loop block 524, wherein the data structure index is incremented by 1, and the logic loops back to start loop block 504 to begin evaluation of the next data structure (e.g., DS1).

If the result of decision block 512 is YES for one of these iterations, the logic is branched to a block 514 in which a maximum latency restriction is imposed for the data structure. The algorithm of FIGS. 1 and 2 is then performed to allocate data structures corresponding to the new maximum latency restriction that is imposed. If a viable allocation is found (e.g., an allocation that meets the capacity and bandwidth constraints for the memory units), the logic proceeds to end loop block 522, and henceforth to start loop block 504 to begin evaluation of the next data structure. If an allocation is not possible with the maximum latency restriction, an improvement cannot be made, and thus the process is aborted, as shown by a return block 520.

It is noted that the logic of this loop is implemented such that a single change in the combination of data structure allocations is made (relative to a previously-tried combination) for each iteration, rather than multiple changes at a time. An exemplary set of updated allocations are shown in a DS0 max column 614, DS1 max column 616, DS2 max column 618, and DS3 max column 620 in the iteration result table 610.

After a reallocation to the data structure allocation is made (via a corresponding maximum latency restriction being applied to at least one of the data structures), the simulator engine is run for that allocation in block 524. If the packet throughput is increased, data pertaining to the reallocated data structures is stored as the best allocation in block 526. If the packet throughput is not increased, the best allocation remains the same as existed at the end of the previous iteration.

The operations and logic contained within the outer loop are continued on an iterative basis until either all of the combinations have been tried, or the process aborts. At this point, the allocation stored in the best allocation table is deemed the optimum allocation for the particular environment being simulated.

Exemplary allocations and throughput values are shown in the iterative result table 610. During the first iteration, none of the allocations are changed. This corresponds to the original allocation shown in FIG. 6*a*. The simulator engine is run for this allocation to produce a first data point having a packet throughput rate of 1,000,000. During the second iteration, a maximum latency rank of low is imposed on data structure DS3. This allocation represents a possible improvement, since the current allocation for data structure DS3 is memory unit MU1, which has medium latency. This new allocation also is determined to be a possible allocation (i.e., an allocation that meets the capacity and bandwidth constraints) in block 518, and simulation of this allocation shows a packet throughput rate of 1,100,000.

During the third iteration, the maximum latency for data structure DS2 is set to low, while the prior restriction on data structure DS3 is removed. This also results in a possible allocation, and the corresponding simulation shows a packet throughput of 1,050,000. During the fourth iteration, a maximum latency restriction of low is imposed on both of data structures DS2 and DS3, which results in yet another possible allocation. In this instance, simulation shows a packet throughput rate of 1,125,000. As illustrated by this result, implementing an allocation that includes a combination of allocations that provided corresponding improvements individually will usually not yield an overall improvement that is the sum of the individual improvements.

Finally, during the fifth iteration, a maximum latency of medium is imposed on data structure DS0. However, since the size of data structure DS0 (256 KB) is larger than the combination of the capacity for all memory units that provide at least a medium latency or better (32+64=96 KB for the combination of memory units MU0 and MU1), this allocation is not possible, and the process aborts. Accordingly, no further improvement is possible, and thus the allocation corresponding to iteration 4 is deemed the best.

Exemplary Simulation Environment

Figure 7:
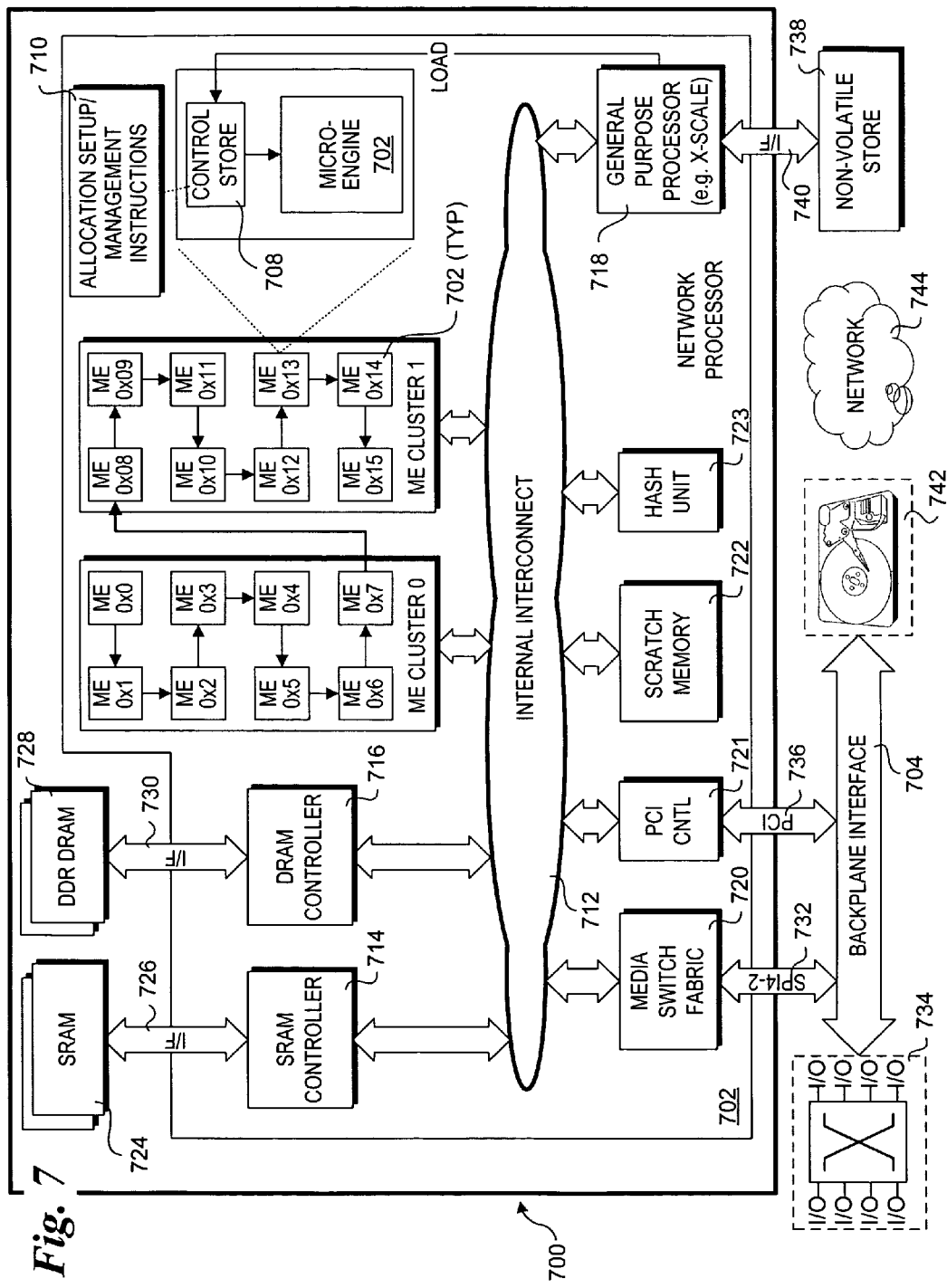
FIG. 7 is a schematic diagram of a network line card that is illustrative of a simulated NPU packet processing environment employed to determine an optimal data structure to memory unit allocation.

FIG. 7 shows an exemplary simulation environment including a line card 700 hosting a network processor 701 including multiple multi-threaded microengines 702. In general, line card 700 is illustrative of various types of network device or element line cards employing standardized or proprietary architectures. For example, a typical line card of this type may comprises an Advanced Telecommunications and Computer Architecture (ATCA) modular board that is coupled to a common backplane in an ATCA chassis that may further include other ATCA modular boards. Accordingly the line card includes a set of connectors to meet with mating connectors on the backplane, as illustrated by a backplane interface 704. In general, backplane interface 704 supports various input/output (I/O) communication channels, as well as provides power to line card 702. For simplicity, only selected I/O interfaces are shown in FIG. 7, although it will be understood that other I/O and power input interfaces also exist.

Network processor 701 includes n microengines 702. In one embodiment, n=8, while in other embodiment n=16, 24, or 32. Other numbers of microengines 702 may also me used. In the illustrated embodiment, 16 microengines 702 are shown grouped into two clusters of 8 microengines, including an ME cluster 0 and an ME cluster 1.

In the illustrated embodiment, each microengine 702 executes instructions (microcode) that are stored in a local control store 708 using multiple hardware threads. Included among the instructions are data structure to memory unit allocation instructions 710 that initialize and manage the use of various memory units in accordance with the data structure/memory unit allocation employed for a given simulation.

Each of microengines 702 is connected to other network processor components via sets of bus and control lines referred to as the processor "chassis". For clarity and simplicity, these bus sets and control lines are depicted as an internal interconnect 712. Also connected to the internal interconnect are an SRAM controller 714, a DRAM controller 716, a general purpose processor 718, a media switch fabric interface 720, a PCI (peripheral component interconnect) controller 721, scratch memory 722, and a hash unit 723. Other components not shown that may be provided by network processor 700 include, but are not limited to, encryption units, a CAP (Control Status Register Access Proxy) unit, and a performance monitor.

The SRAM controller 714 is used to access an external SRAM store 724 via an SRAM interface 726. Similarly, DRAM controller 716 is used to access an external DRAM store 728 via a DRAM interface 730. In one embodiment, DRAM store 728 employs DDR (double data rate) DRAM. In other embodiment DRAM store may employ Rambus DRAM (RDRAM) or reduced-latency DRAM (RLDRAM).

In the context of the foregoing description, each of SRAM store 724 and DRAM store 728 may be deployed as one or more memory units of a corresponding latency type. For example, SRAM controller 714 may be a multi-channel controller, with each channel used for accessing a respective bank of memory in SRAM store 724. Accordingly, each bank of SRAM memory could comprise a separate memory unit with a latency type=SRAM off-chip (or latency=medium under the foregoing algorithm). Similarly, scratch memory 722 may be deployed as one or more memory units with a corresponding latency type.

General-purpose processor 718 may be employed for various network processor operations. In one embodiment, control plane operations are facilitated by software executing on general-purpose processor 718, while data plane (e.g., fast-path) operations are primarily facilitated by instruction threads executing on microengines 700.

Media switch fabric interface 720 is used to interface with the media switch fabric for the network element in which the line card is installed. In one embodiment, media switch fabric interface 720 employs a System Packet Level Interface 4 Phase 2 (SPI4-2) interface 732. In general, the actual switch fabric may be hosted by one or more separate line cards, or may be built into the chassis backplane. Both of these configurations are illustrated by switch fabric 734.

PCI controller 722 enables the network processor to interface with one or more PCI devices that are coupled to backplane interface 704 via a PCI interface 736. In one embodiment, PCI interface 736 comprises a PCI Express interface.

During initialization, coded instructions (e.g., microcode) to facilitate various packet-processing functions and operations are loaded into control stores 708. Data structure to memory unit allocation instructions 710 are also loaded at this time. In one embodiment, the instructions are loaded from a non-volatile store 738 hosted by line card 702, such as a flash memory device. Other examples of non-volatile stores include read-only memories (ROMs), programmable ROMs (PROMs), and electronically erasable PROMs (EEPROMs). In one embodiment, non-volatile store 738 is accessed by general-purpose processor 718 via an interface 740. In another embodiment, non-volatile store 738 may be accessed via an interface (not shown) coupled to internal interconnect 712.

In addition to loading the instructions from a local (to line card 702) store, instructions may be loaded from an external source. For example, in one embodiment, the instructions are stored on a disk drive 742 hosted by another line card (not shown) or otherwise provided by the network element in which line card 702 is installed. In yet another embodiment, the instructions are downloaded from a remote server or the like via a network 744 as a carrier wave.

The basic idea for simulation is to simulate packet-processing operations performed by various components of the simulated environment. For example, packets in a modeled stream of packets are to be forwarded and (optionally) classified using the various components in the simulated environment. The simulator calculated processing latencies incurred during the simulated packet processing operations. In particular, memory latencies are calculated based on a modeled latency for each type of memory unit, as well as bottlenecks caused by bandwidth constraints (as applicable). For example, the memory latency for scratch memory 722 would have a first modeled latency, the memory latency for SRAM store 724 would have a second modeled latency greater than that for scratch memory 722, while the memory latency for DRAM store 728 would have a third modeled latency greater than that for SRAM store 724. Other memory latencies could also be modeled, such as latencies for local memory resources for each microengine (not shown).

At the same time, other processing latencies are calculated or otherwise employed in the simulation. For example, some percentage of packets typically pose some type of problem, and cannot be handled by fast-path processing (i.e., handled by the microengine threads). Accordingly, these problem packets are forwarded to slow-path processing handled by general-purpose processor 718. Other packet processing operations are similarly modeled, so that packet-processing operations that would be performed by an actual implementation of line card 700 are accurately simulated in view of the modeled packet stream. From the simulation, a packet throughput rate may be determined. Based on changes to the data structure/memory unit allocation, different packet throughput rates will be calculated by the simulator, as illustrated above in iteration result table 610.

In accordance with aspects of the embodiments described herein, the foregoing algorithms may be implemented by software programs and/or modules running on appropriate processing elements and/or systems. For example, software may be executed on a computer system to generate data structures allocations in accordance with the pseudo code and/or flowcharts illustrated herein. Thus, embodiments of this invention may be used as or to support software components executed upon some form of processing core (such as the processor of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.)

Figure 8:
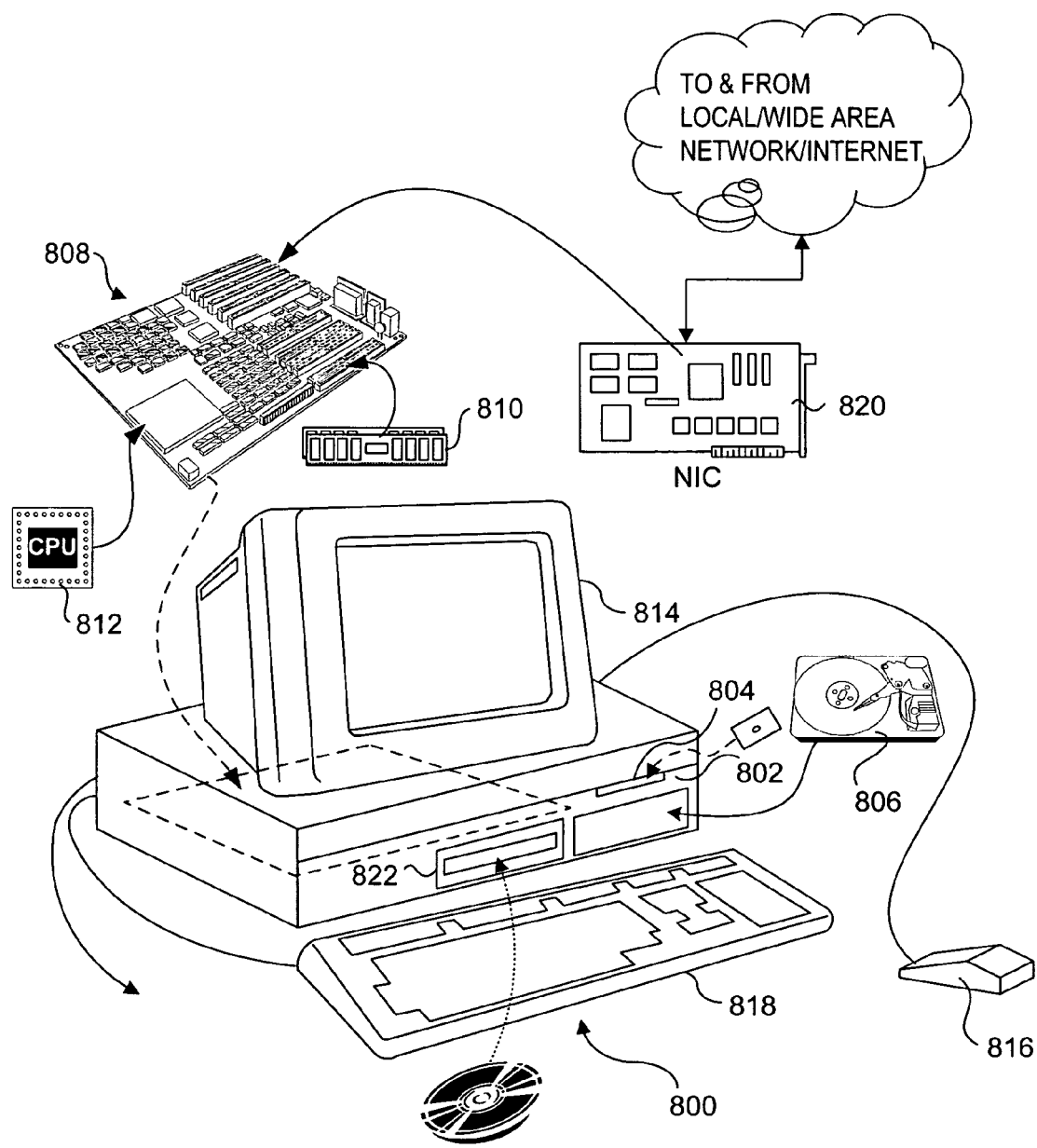
FIG. 8 is a schematic diagram of an exemplary computer system that may be used to execute software used to implement embodiments of the algorithms described herein.

With reference to FIG. 8, a generally conventional computer 800 is illustrated, which is suitable for executing software programs and/or modules. Computer 800 includes a processor chassis 802 in which are mounted an optional floppy disk drive 804, a hard drive 806, a motherboard 808 populated with appropriate integrated circuits including memory 810 and one or more processors (CPUs) 812, and a power supply (not shown), as are generally well known to those of ordinary skill in the art. It will be understood that hard drive 806 may comprise a single unit, or multiple hard drives, and may optionally reside outside of computer 800. A monitor 814 is included for displaying graphics and text generated by software programs and program modules that are run by the computer. A mouse 816 (or other pointing device) may be connected to a serial port (or to a bus port or USB port) on the rear of processor chassis 802, and signals from mouse 816 are conveyed to the motherboard to control a cursor on the display and to select text, menu options, and graphic components displayed on monitor 814 by software programs and modules executing on the computer. In addition, a keyboard 818 is coupled to the motherboard for user entry of text and commands that affect the running of software programs executing on the computer. Computer 800 also includes a network interface card 820 or built-in network adapter for connecting the computer to a computer network, such as a local area network, wide area network, or the Internet.

Computer 800 may also optionally include a compact disk-read only memory (CD-ROM) drive 822 into which a CD-ROM disk may be inserted so that executable files and data on the disk can be read for transfer into the memory and/or into storage on hard drive 806 of computer 800. Other mass memory storage devices such as an optical recorded medium or DVD drive may be included.

In one implementation, software for implementing the algorithms described herein is included as part of a NPU software design tool. In one configuration for the design tool, both software for performing the algorithms and software for implanting the simulator engine are provided within an integrated toolkit.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for allocating data structures to memory units in a network processor unit (NPU) packet processing environment, comprising:
   storing data identifying an available capacity, available bandwidth, and memory latency for each memory unit;
   storing data identifying a size and bandwidth usage for each data structure;
   performing an iterative algorithm via execution of software on a computer system, the iterative algorithm iterating over the data structures to allocate the data structures to the memory units by,
      retrieving the data stored for each memory unit and each data structure;
      attempting to allocate data structures to memory units with lower latency; and
      if insufficient capacity or bandwidth is available, allocating a data structure to a memory unit with a higher latency that has sufficient available capacity and bandwidth;
   employing a simulator to determine a packet throughput rate of a first allocation of data structures to memory units in a simulated NPU packet processing environment;
   generating a second allocation of data structures to memory units, the second allocation including reallocation of at least one data structure to a lower latency memory unit;
   employing the simulator to determine a packet throughput rate of the second allocation of data structures to memory units; and
   determining which of the first and second allocations provides a high packet throughput rate.

2. The method of claim 1, further comprising:
   storing data identifying the available capacity, available bandwidth, a relative memory latency, and a memory unit identifier for each memory unit as an ordered list of memory units; and
   storing data identifying the size, requested bandwidth and a data storage identifier for each data structure as an ordered list of data structures.

3. The method of claim 2, wherein the iterative algorithm performs operations including:
   iterating through the ordered list of the data structures using an outside algorithmic loop; and
   iterating through the ordered list of memory units using an inside algorithmic loop the performs operations including,
   determining if a remaining capacity and remaining bandwidth of a current memory unit is sufficient to satisfy a corresponding size and bandwidth usage for a current data structure being evaluated during a current iteration of the outer loop; and, if so,
   allocating that current data structure to the current memory unit; otherwise, iterating the inner loop to consider one or more next memory units in the ordered list to which the current data structure may be allocated,
   wherein a successful completion of the algorithm allocates the data structures to the memory units in a manner that satisfies capacity and bandwidth constraints for each memory unit.

4. The method of claim 1, further comprising:
   imposing a maximum latency on at least one data structure to memory unit allocation in the first allocation to obtain the second allocation.

5. The method of claim 1, further comprising:
   generating a next allocation of data structures to memory units, employing the simulator to determine a packet throughput rate of the next allocation in the simulated NPU packet processing environment, and determining which of the next and a current best allocation provides the highest packet throughput rate on an iterative basis to determine a best allocation of data structures to memory units for the simulated NPU packet processing environment.

6. The method of claim 5, wherein the operations to determine the best allocation of data structures to memory units for the simulated NPU packet processing environment are performed via execution of software instructions on the computer system.

7. A machine-readable medium, to store instructions that if executed perform operations comprising:
   allocating data structures to memory units in a network processor unit (NPU) packet processing environment by performing an iterative algorithm including,
      retrieving data stored for each memory unit and each data structure, the data including resource usage for each data structure and resource availability constraints and latency for each memory unit;
      attempting to allocate data structures to memory units with lower latency; and
      if the resource availability for a given memory unit is insufficient to meet the resource requirements of a given data structure, allocating the data structure to another memory unit with a higher latency,
   wherein, upon completion of the allocation, the resource availability constraints for each memory unit are satisfied, the allocation to constitute a first allocation;
   calling a simulator to determine a packet throughput rate of the first allocation in a simulated NPU packet processing environment;
   generating a second allocation of data structures to memory units the second allocation including reallocation of at least one data structure to a lower latency memory unit;
   calling the simulator to determine a packet throughput rate of the second allocation of data structures to memory units; and
   determining which of the first and second allocations provides a high packet throughput rate.

8. The machine-readable medium of claim 7, wherein execution of the instructions performs further operations comprising:
   retrieving data identifying size and bandwidth usage for a current data structure corresponding to a current iteration of an outside loop;
   retrieving data identifying available capacity, available bandwidth, and memory latency for a current memory unit corresponding to a current iteration of an inside loop;
   determining if the available capacity and available bandwidth of the current memory unit meets the size and bandwidth usage of the current data structure; and if so,
   allocating the current data structure to the current memory unit; otherwise;
   iterating the inner loop to evaluate a next memory unit, the iteration of the inner loop continuing until a memory unit with sufficient available capacity and available bandwidth to meet the size and bandwidth usage for the current data structure is found; and
   performing iteration of the outer loop to allocate each data structure to a corresponding memory unit.

9. The machine-readable medium of claim 7, wherein execution of the instructions performs further operations comprising:
generating a next allocation of data structures to memory units, calling the simulator to determine a packet throughput rate of the next allocation in the simulated NPU packet processing environment, and determining which of the next and a current best allocation provides the highest packet throughput rate on an iterative basis to determine a best allocation of data structures to memory units for the simulated NPU packet processing environment.

10. The machine-readable medium of claim 9, wherein the instructions are embodied in a NPU software design tool including the simulator.

11. A method of optimizing memory unit usage comprising:
identifying a plurality of memory modules, each memory module having a size and a latency, and each memory module having a maximum access bandwidth governed by a corresponding bandwidth of a bus;
allocating each of a plurality of data structures to be stored in one of the plurality of memory modules, each data structure having a size and an access bandwidth requirement, wherein the allocating operation is not to exceed the size of any memory module or the maximum access bandwidth of any memory module; and
simulating packet processing based on an allocation of data structures to memories according to the allocating operation to extrapolate an average packet throughput rate corresponding to the allocation, said simulating operation to take into account the latency of the memory module to which each data structure is allocated.

12. The method of claim 11 wherein allocating comprises:
ordering the plurality of data structures by resource usage; and
allocating each data structure in order from highest resource usage to lowest resource usage.

13. The method of claim 12 wherein the resource usage of a data structure is the size of the data structure.

14. The method of claim 12 wherein the resource usage of a data structure is the access bandwidth requirement of the data structure.

15. The method of claim 11 wherein allocating comprises:
ordering the plurality of memory modules by latency; and
allocating data structures to a lower-latency memory module before allocating data structures to a higher-latency memory module.

16. The method of claim 15, further comprising:
allocating data structures to a plurality of memory modules with identical latencies in round-robin order.

17. The method of claim 11, further comprising:
repeating the allocating and simulating operations to obtain an average packet throughput rate corresponding to a plurality of different allocations; and
recording the allocation corresponding to a highest average packet throughput rate.

18. The method of claim 11, further comprising:
if the allocating operation fails to allocate all of the plurality of data structures without exceeding the size of any memory module or the maximum access bandwidth of any memory module, then
recording a maximum number of the plurality of data structures that could be allocated without exceeding the size of any memory module or the maximum access bandwidth of any memory module.

* * * * *